(12) United States Patent
Ruhrig et al.

(10) Patent No.: US 6,294,037 B1
(45) Date of Patent: Sep. 25, 2001

(54) PROCESS AND DEVICE FOR APPLYING SECTIONS OF MATERIAL ON A MATERIAL WEB

(75) Inventors: Manfred Ruhrig, Weinheim (DE); Gordon Klassen, Duarte, CA (US)

(73) Assignee: Meto International GmbH, Hirschhorn (DE)

( * ) Notice: Subject to any disclaimer, the term of this patent is extended or adjusted under 35 U.S.C. 154(b) by 0 days.

(21) Appl. No.: 09/147,647
(22) PCT Filed: Jul. 29, 1997
(86) PCT No.: PCT/EP97/04114
 § 371 Date: Apr. 26, 1999
 § 102(e) Date: Apr. 26, 1999
(87) PCT Pub. No.: WO98/05500
 PCT Pub. Date: Feb. 12, 1998

(51) Int. Cl.[7] .................................................. B32B 31/00
(52) U.S. Cl. ...................... 156/229; 156/238; 156/249; 156/256; 156/265; 156/270; 156/299; 156/519; 156/552
(58) Field of Search ..................... 156/229, 230, 156/238, 247, 249, 256, 265, 269, 270, 297, 299, 302, 552, 556, 519, 259

(56) References Cited

U.S. PATENT DOCUMENTS

| | | | |
|---|---|---|---|
| 3,835,756 | * 9/1974 | Bosse | 156/552 |
| 4,364,787 | * 12/1982 | Radzins | 156/552 |
| 4,767,487 | * 8/1988 | Tomsovic, Jr. | 156/552 |
| 5,244,530 | * 9/1993 | Collins et al. | 156/552 |
| 5,250,134 | * 10/1993 | Thomas et al. | 156/552 |
| 5,296,080 | * 3/1994 | Merkatoris et al. | 156/552 |
| 5,584,954 | * 12/1996 | Van Der Klugt | 156/552 |
| 6,022,443 | * 2/2000 | Rajala et al. | 156/302 |

FOREIGN PATENT DOCUMENTS

| | | |
|---|---|---|
| 4239846A1 | 6/1994 | (DE) . |
| 4436284A1 | 4/1996 | (DE) . |
| 0359057A1 | 3/1990 | (EP) . |
| 756 256-A1 | * 1/1997 | (EP) . |
| 0756256A1 | 1/1997 | (EP) . |
| WO 97/02723 | 1/1997 | (WO) . |

OTHER PUBLICATIONS

Int'l. Prel. Exam. Report, PCT/EP97/04114, Jul. 29, 1997.

* cited by examiner

Primary Examiner—Sam Chuan Yao
(74) Attorney, Agent, or Firm—Jones, Tullar & Cooper, P.C.

(57) ABSTRACT

The invention relates to a method and a device for joining a first web material to a second web material, in which the first web material is divided into individual sections of a predetermined length while the second web material is continuous. According to the present invention the method and device permitting sections of a first web material to be applied without waste to a second web material. With regard to the method, the first web material is applied to a substrate, by separating every two successive sections of the first web material (2) from each other so that they are spaced by a predetermined relative distance, and by applying the sections to the second web material at the noted relative distance.

7 Claims, 6 Drawing Sheets

PROCESS AND DEVICE FOR APPLYING SECTIONS OF MATERIAL ON A MATERIAL WEB

FIELD OF THE INVENTION

The present invention relates to a method and a device for joining a first web material to a second web material, in which the first web material is divided into individual sections of a predetermined length while the second web material is continuous. In particular the sections of the first web material are semi-hard or hard magnetic sections, and the second web material is a soft magnetic web material (deactivatable security elements). It is possible, however, for the sections of the first web material to also be sections of a soft magnetic material and for the second web material to be a continuous substrate made of paper or plastic, for example (non-deactivatable security elements).

BACKGROUND OF THE INVENTION

Soft magnetic materials (e.g., Permalloy) are characterized by high permeability and low coercive forces. They are being used increasingly for electronic article surveillance in department stores and warehouses. For this purpose an alternating magnetic field is emitted into a monitoring zone located preferably in the entrance/exit area of the establishment under surveillance. This field excites the soft magnetic material of the electronic security element so that it emits a characteristic signal. This signal is then detected by a detecting device sensitive to the signal's frequency range and evaluated as an identification signal for merchandise passing the monitoring zone in an unauthorized manner; an alarm is triggered.

The detecting device should no longer respond, of course, once the merchandise has been rightly purchased. This purpose is fulfilled by semi-hard or hard magnetic sections in strip form. Semi-hard or hard magnetic material (e.g., SEMIVAC from the company Vacuumschmelze) displays a relatively high coercive force. As a result of this high coercive force, the alternating magnetic field in the monitoring zone has no effect on the deactivator material in the non-deactivated state. On the other hand, as soon as the deactivator material is driven to saturation by a suitably strong magnetic field—as occurs after the product is rightly purchased—its magnetization prevents the soft magnetic material from responding to the alternating magnetic field in the monitoring zone.

Deactivatable security elements are used in large quantities. Typically, each security element is employed only once for article surveillance, so economical production is a special concern.

From German Patent DE 42 23 394 A1, there is known a method for the production of security labels which includes the following production steps: A hard magnetic metal strip is adhered to a non-metallic ribbon, and a carrier foil of high flexibility in thickness is then adhered to the metal strip. In particular the carrier foil is of a thickness and flexibility suitable to make deformation of the metal strip by a rotating cutter sufficient to sever the metal strip into individual sections. The severed sections of metal strip and non-metallic ribbon are delaminated from the carrier foil, and a soft magnetic ribbon is subsequently applied to the remaining parts of the metal strip. To produce a finished label ribbon, label paper is adhered—as is generally customary—to one side of the ribbon and a carrier ribbon to the other side.

This known method is doubtless ideally suited for supplying large numbers of security elements. Less satisfactory is, however, the relatively high effort needed to manufacture the semi-hard or hard magnetic sections and to apply them to the soft magnetic strips. The waste of semi-hard or hard magnetic material as a result of the cutting operation is also a disadvantage.

SUMMARY OF THE INVENTION

It is an object of the present invention to provide a method and a device permitting sections of a first web material to be applied without waste to a second web material. In particular—as previously mentioned—the sections of the first web material involve semi-hard or hard magnetic sections, while the second web material is a soft magnetic web material. It is also possible, however, for the sections of the first web material to be sections of a soft magnetic material, and for the second web material to be a continuous substrate fabricated from paper or plastic, for example.

With regard to the method, this object is accomplished by applying the first web material to a substrate, by separating every two successive sections of the first web material from each other so that they are spaced by a predetermined relative distance a, and by applying the sections to the second web material at the relative distance a.

An advantageous further aspect of the method of the present invention provides for the substrate to be made of an extendible material and to have a width smaller than, equal to or greater than the width of the first web material.

In the use of an extendible substrate, it has proven to be particularly advantageous for the width of the extendible substrate to be no bigger than the width of the first web material. The first web material is subsequently simply divided into individual sections while the substrate is preserved as a continuous layer. Preferably, the semi-hard or hard magnetic web material can be severed into individual sections by means of a laser.

An alternative aspect of the method of the present invention provides for having the substrate wider than the first web material and dividing the first web material and the substrate into individual sections at least across the width of the first web material. In this case the substrate can also be extendible, but this property is of no relevance in the performance of the method.

An advantageous further aspect of the method of the present invention provides for the substrate in the area of the divisions in the first web material to be stretched so that the sections of the first web material are spaced from each other by a desired distance. This stretching of an unprocessed substrate is only possible, of course, if the substrate is made of a stretchable material of sufficiently high tear resistance.

To produce a gap between the individual sections of the semi-hard or hard magnetic web material in cases where a non-extendible substrate is used it is necessary to divide the first web material and the substrate into individual sections at least across the width of the first web material. Subsequently, the first web material and the substrate are pulled apart in the area of the divisions so that the individual sections are at a desired relative distance.

An advantageous aspect of the method of the present invention provides for a further material strip to be applied to the laminate. This strip, which is fabricated from plastic, for example, serves to turn the laminate as such into a compact unit. In particular this prevents individual sections of the first or second web material from becoming detached during a subsequent longitudinal cutting operation.

Production costs can be minimized—as was previously indicated—by cutting the finished laminate in the longitudinal direction and hence into strips. This feature permits the use of accordingly wide and hence easy-to-process first and second web materials.

With regard to the device, the object of the present invention is accomplished by providing a cutting station and an additional station, wherein the first web material applied to a substrate is divided in the cutting station into individual sections or the first web material and the substrate are divided in the cutting station into individual sections at least across the width of the first web material, wherein the additional station is used for pulling the individual sections of the first web material apart, and wherein the additional station is associated with a laminating device in which the relatively spaced sections of the first web material are applied to the second web material.

Advantageously, each individual station comprises at least one pair of rolls.

An advantageous further aspect of the device of the present invention suggests constructing one roll of the pair of rolls in the additional station as a guide roll for the laminate formed from the first web material and the substrate. Furthermore, the pair of rolls in the additional station has a higher working speed (peripheral speed) than the pair or rolls in the cutting station. Stretching the flexible substrate in the area of the divisions and pulling apart the individual sections of the first web material and the substrate are thus performed in a simple manner using two different working speeds in the two stations.

When a non-extendible substrate is used, an alternative embodiment of the device of the present invention provides for one roll of the pair of rolls to have a larger circumference in the area in which the first web material is guided than in the areas in which the projecting edges of the substrate are guided. Hence the different working speed is not achieved in this embodiment by different control signals to the individual stations but simply by increasing the circumference of the guide cylinder. This goes hand in hand likewise with an increase in the circumferential speed of the guide roll in the area in which the first web material is guided.

BRIEF DESCRIPTION OF THE DRAWINGS

The present invention will be explained in more detail in the following with reference to the accompanying drawings. In the drawings.

FIG. 2b is a top plan view of the cylinder of FIG. 2a;

DESCRIPTION OF THE PREFERRED EMBODIMENTS

Figure 1:
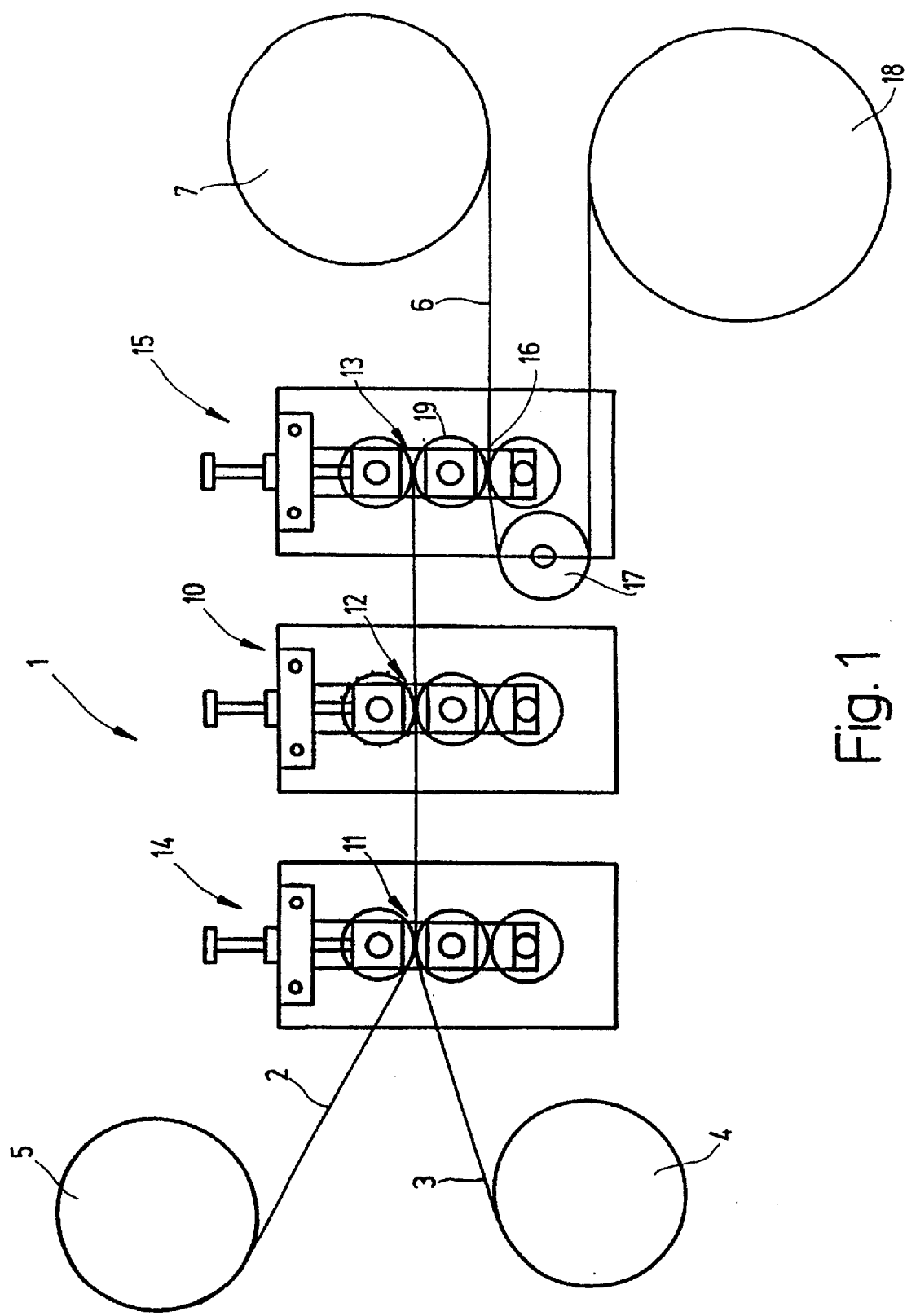
FIG. 1 is a longitudinal sectional view of the device of the present invention illustrating a first embodiment thereof.

FIG. 1 shows a longitudinal section through the device 1 of the present invention illustrating a first advantageous embodiment thereof. The device is comprised of three stations: a laminating station 14, a cutting station 10 and an additional station 15. Each of the stations 14, 10, 15 has at least one pair of rolls 11, 12, 13. A laminate comprised of a substrate 3 and a semi-hard or hard magnetic web material 2 is conveyed through the gap between the pairs of rolls 11, 12, 13.

The first web material 2 is wound off a supply roll 5 and the substrate 3 from a supply roll 4. The substrate material 3 can be polyethylene (PE) or polyvinyl chloride (PVC), for example. In the laminating station 14 the first web material 2 is laminated onto the substrate 3. In the cutting station 10 the first web material 2 is divided, possibly along with the substrate 3, into individual sections 8 at least across the width of the first web material 2. To obtain a relative spacing between the individual sections 8 of the first web material 2 or the first web material 2 and the substrate 3, the additional station 15 has a higher working speed than the cutting station 10. The different circumferential speeds of the pairs of rolls 12, 13 in the two stations 10, 15 cause the laminate formed from the substrate 3 and the first web material 2 to be stretched and pulled apart in the area of the divisions 9. The relative distance a of the individual sections 8 depends in this case on the difference in relative speeds of the two pairs of rolls 12, 13 and can be controlled as required within wide limits.

As becomes further apparent from FIG. 1, the laminate formed from the first web material 2 and the substrate 3 is guided over the lower cylinder 19 of the pair of rolls 13. Associated with the cylinder 19 is a laminating device 16, which is used to add a second soft magnetic web material 6 to the laminate 2, 3. Before the finished laminate 20, formed from the soft magnetic web material 6 and the sections 8 of the semi-hard or hard magnetic web material 2, is wound onto a take-up roll 18, the substrate 3 is removed completely; it would appear necessary at least to cut off the projecting edges. Both operations eliminate or reduce the tension in the finished laminate 20, which is then used for electronic article surveillance in department stores, for example. Further pertinent details will appear from the subsequent description of the further Figures.

Figure 2A:
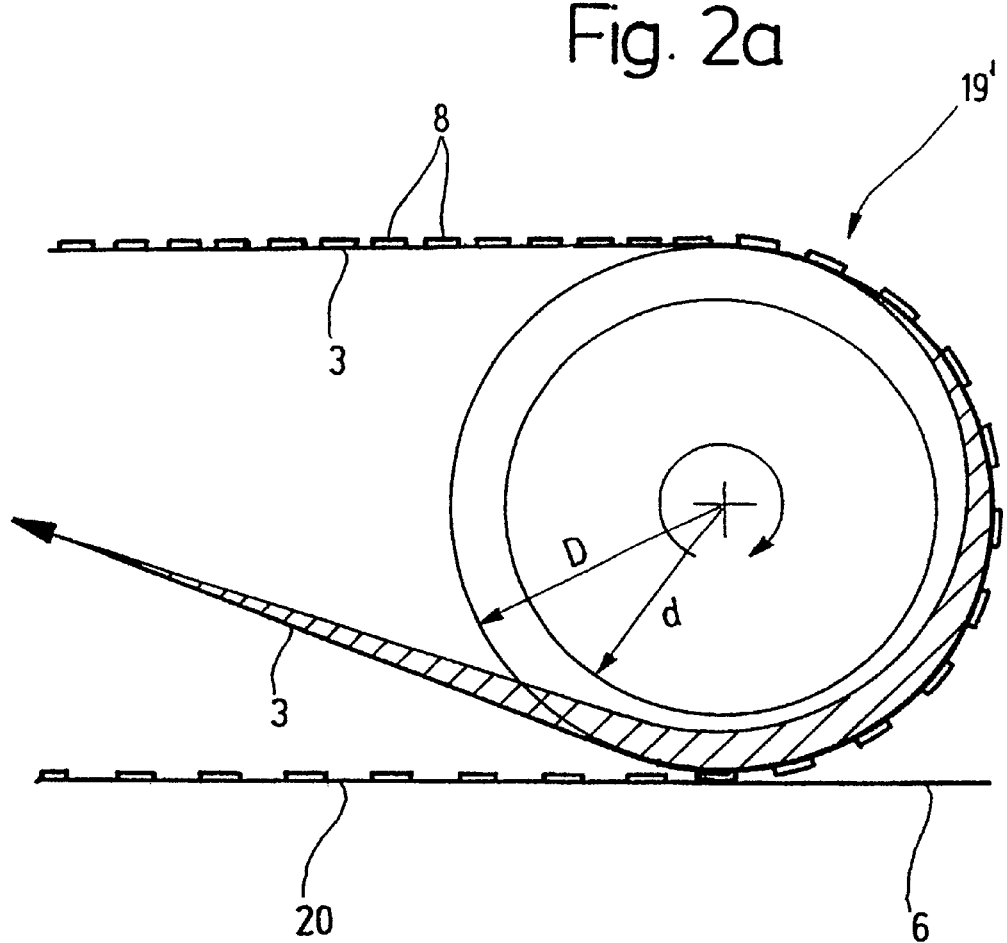
FIG. 2a is a cross sectional view of a cylinder as utilized in a second embodiment of the device of the present invention.
Figure 2B:
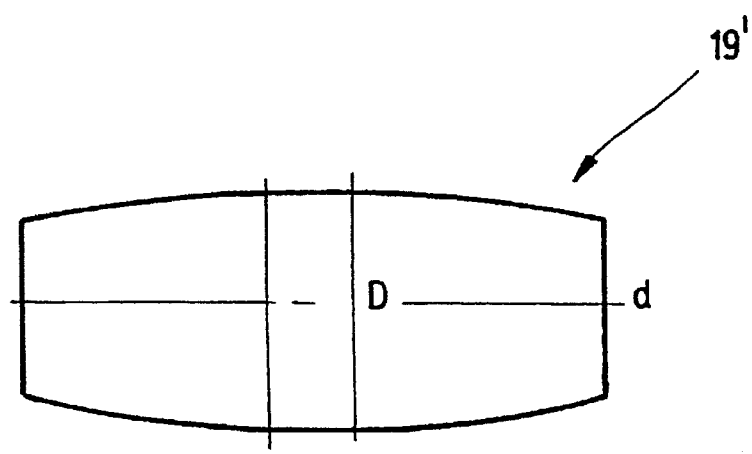

FIG. 2a shows a cross section of a cylinder 19' used in a second embodiment of the device of the present invention. FIG. 2b is a top plan view of the cylinder 19' of FIG. 2a. The cylinder 19' has various diameters: While the outer diameter d is equal to the diameter of the other cylinders of the pairs of rolls 11, 12, 13 shown in FIG. 1, the central area over which the semi-hard or hard magnetic web material 2 is guided has a bigger diameter D. The effect achieved by the provision of different circumferential speeds of the pairs of rolls 12, 13 according to the embodiment of FIG. 1 is, in this embodiment, achieved by the bigger diameter D in the area where the first web material 2 is guided. Advantageously, in this embodiment the bent substrate 3 is removed completely from the sections 8 of the first web material 2 as soon as the latter is joined to the second web material 6.

Figure 3A:
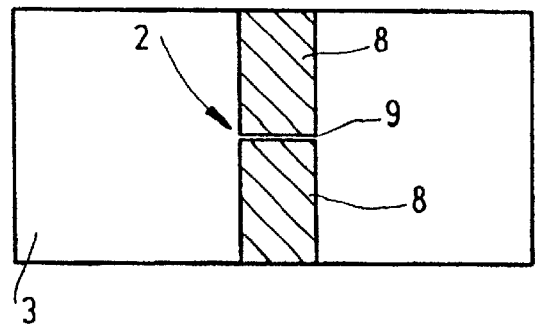
FIG. 3a is a top plan view of a laminate comprising a flexible substrate and a sectioned first web material.

FIG. 3a is a top plan view of a laminate comprised of a flexible substrate 3 and a sectioned first web material 2. As was previously mentioned, it is sufficient when using an extendible substrate 3 simply to divide the first web material 2 into individual sections 8. Hence the substrate 3 can have any width: It can be narrower or wider than the first web material 2, and it can just as well have the same width.

Figure 3B:
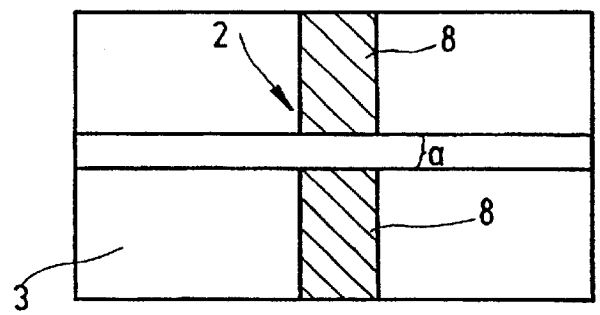
FIG. 3b is a top plan view of the laminate of FIG. 3a as it appears following stretching of the flexible substrate.

As can be seen from FIG. 3b, the flexible substrate 3 stretches in the longitudinal direction in the area of the division 9 in the first web material 2. After stretching, the two sections 8 are spaced from each other by a distance a.

Figure 4A:
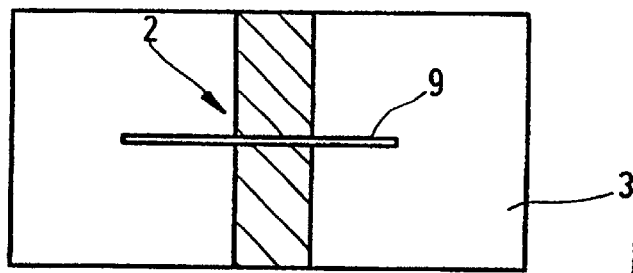
FIG. 4a is a top plan view of a laminate comprising a flexible sectioned substrate and a sectioned first web material.
Figure 4B:
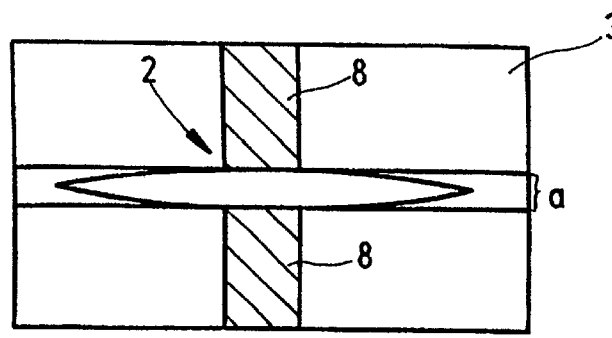
FIG. 4b is a top plan view of the laminate of FIG. 4a as it appears following stretching of the flexible substrate.

FIG. 4a is a top plan view of a laminate comprised of a flexible sectioned substrate 3 and a sectioned first web material 2. FIG. 4b shows the laminate of FIG. 4a after stretching of the flexible substrate 3. Whilst in the embodiment of FIG. 3a and FIG. 3b only the first web material 2 is divided into individual sections 8, in the embodiment shown in this Figure the substrate 3 is also sectioned. This reduces the tension in the laminate.

Figure 5:
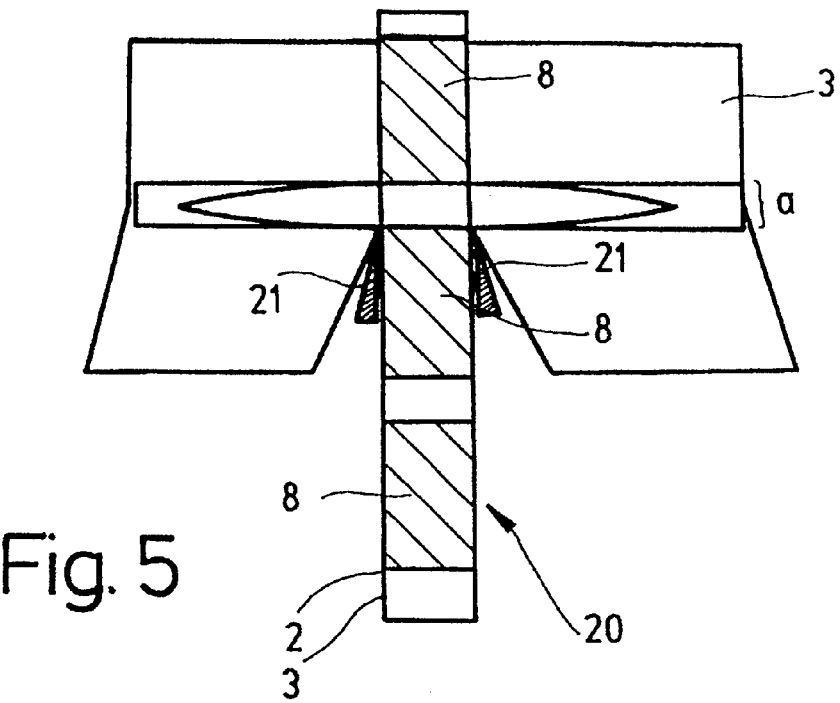
FIG. 5 is a top plan view of the finished laminate on removal of the projecting edges of the substrate.
Figure 6:
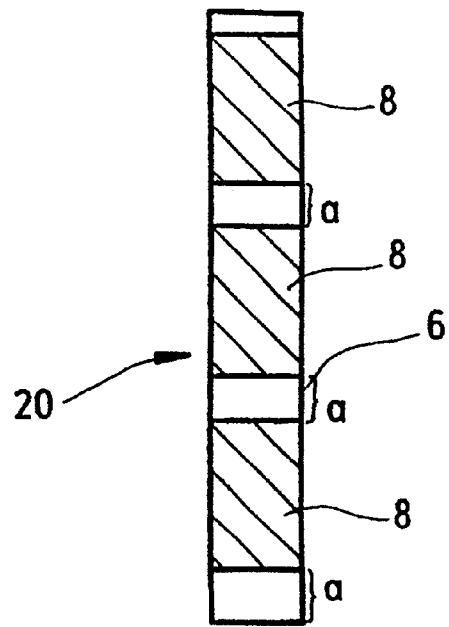
FIG. 6 is a top plan view of the finished laminate on delamination of the substrate.

To reduce the tension in the laminate 20 still further, either the projecting edges of the substrate 3 are cut off by means of cutting devices 21—this possibility is shown schematically in FIG. 5—or the substrate 3 is delaminated completely from the laminate comprising the soft magnetic web material 6 with applied sections 8 of semi-hard or hard magnetic material 2.

Figure 7:
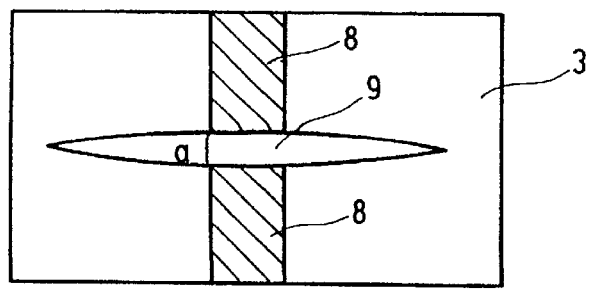
FIG. 7 is a top plan view of a laminate comprising a non-flexible substrate and a first web material as it appears following pulling apart of the individual sections of the first web material and the substrate.

FIG. 7 is a top plan view of a laminate 20 comprising a non-flexible substrate 3 and a first web material 2 after pulling apart the individual sections 8 of the first web material 2 and the substrate 3. According to an advantageous further aspect, a continuous strip preferably made of plastic (e.g., polyester) is applied to the laminate. This strip helps the laminate to form a compact unit, as the result of which it is then better to further process.

Figure 8:
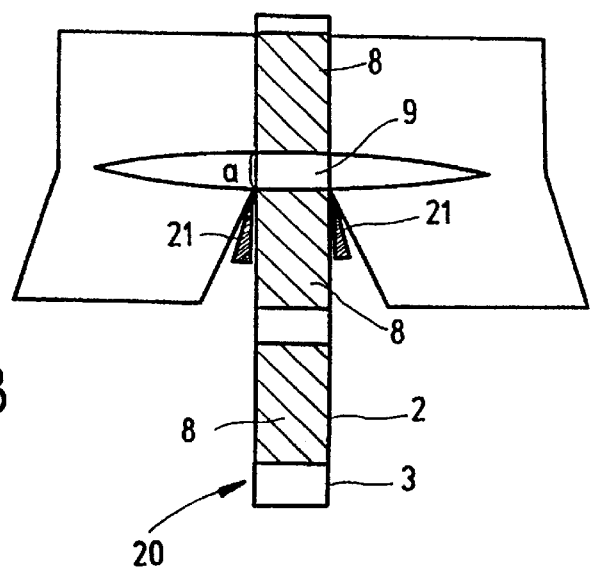
FIG. 8 is a top plan view of the finished laminate on removal of the projecting edges of the substrate.
Figure 9:
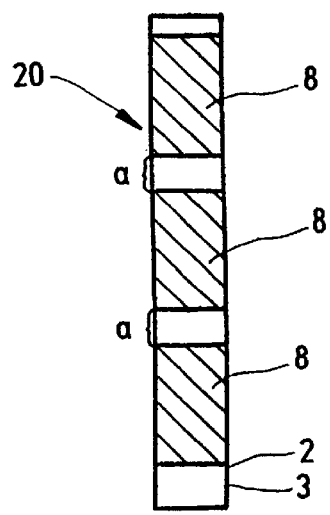
FIG. 9 is a top plan view of the finished laminate on delamination of the substrate.

FIG. 8 is a top plan view of the finished laminate 20 on removal of the projecting edges of the substrate 3. FIG. 9 is a top plan view of the finished laminate 20 where the substrate 3 has been removed completely from the soft magnetic web material 6 with laminated sections 8 of semi-hard or hard magnetic material.

Figure 10:
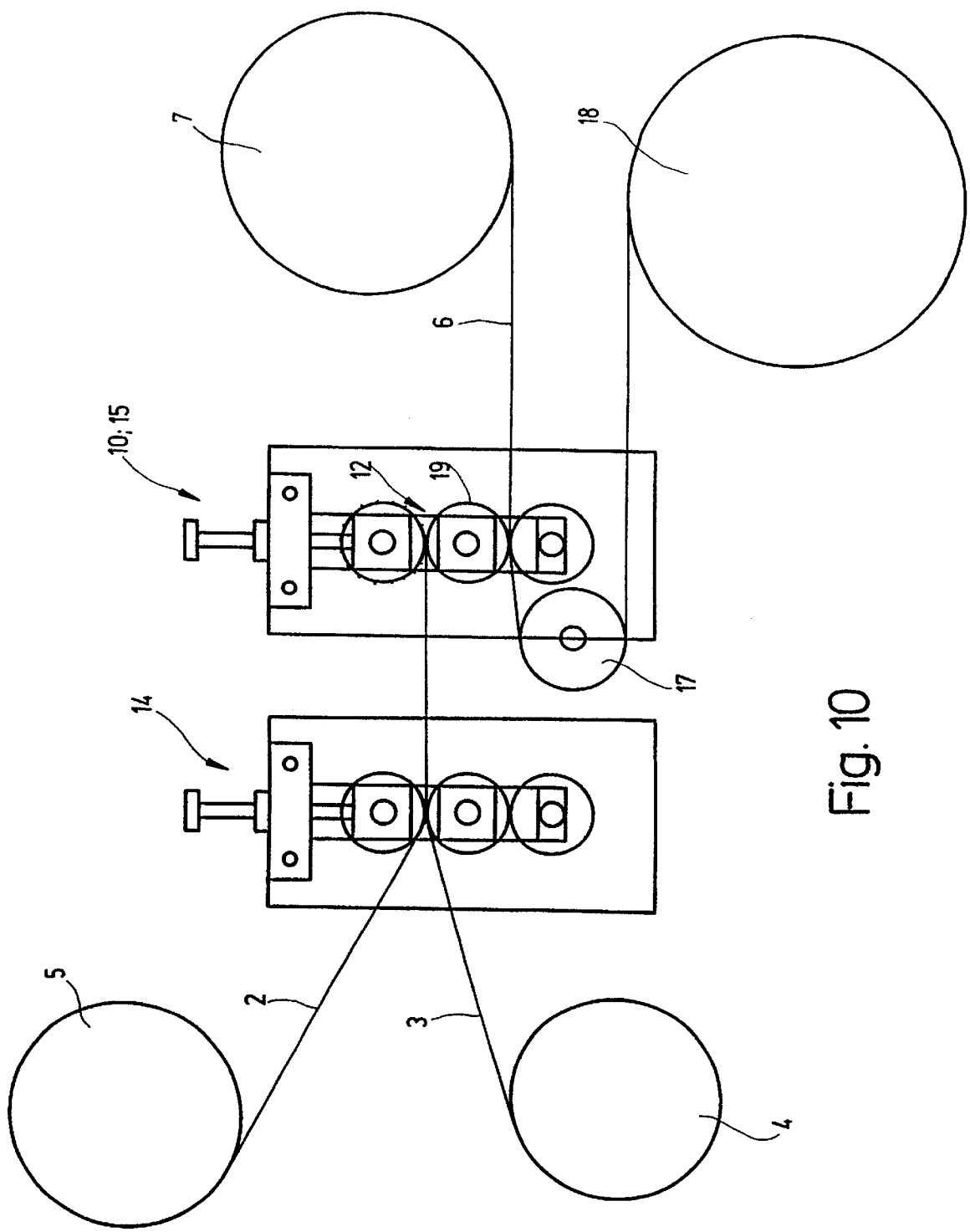
FIG. 10 is a longitudinal sectional view of the device of the present invention illustrating a preferred embodiment thereof.

FIG. 10 shows a preferred embodiment of the device of the present invention. Unlike the device shown in FIG. 1, both the cutting of the first web material 2 or, as the case may be, the cutting of the first web material 2 together with the substrate 3, and their lamination onto the second web material take place in one station. The cutting cylinder, which in the embodiment shown is the upper of the two cylinders in the pair of rolls 12, has a lower circumferential speed than the guide cylinder 19 and the platen cylinder 22 positioned underneath the guide cylinder.

What is claimed is:

1. A method of joining a first web material to a second web material, comprising the steps of:

provinding a first web material, a second web material and a substrate;

applying the first web material to the substrate;

dividing the first web material on the substrate into individual sections;

pulling the substrate between the individual sections of the divided first web material so that the individual sections of the divided first web material are spaced from each other by a predetermined relative space; and applying the individual sections of the divided first web material to the second web material at said predetermined relative distance.

2. The method as defined in claim 1 wherein said pulling step comprises stretching the substrate.

3. The method as defined in claim 1 wherein said pulling step comprises pulling apart the substrate.

4. The method as defined in claim 1 further comprising the step of:

fabricating the substrate from an elastic material which has a width smaller than, equal to, or greater than the width of the divided first web material.

5. The method as defined in claim 1 further comprising the step of:

fabricating the substrate from a plastically deformable material of a low yield point and sufficiently high tear resistance, wherein the width of the substrate is smaller than, equal to, or greater than the width of the divided first web material.

6. The method as defined in claim 1 further comprising the step of:

conforming the width of the substrate so that it does not exceed the width of the divided first web material, wherein only the divided first web material is divided into individual sections.

7. The method as defined in claim 1 further comprising the step of:

forming the width of the substrate to be wider than the width of the divided first web material, wherein the divided first web material and the substrate are divided into individual sections, at least across the width of the divided first web material.

* * * * *